United States Patent
Raikar et al.

(10) Patent No.: US 12,552,214 B1
(45) Date of Patent: Feb. 17, 2026

(54) VEHICLE AIR SPRING SYSTEM AND METHODS FOR CONTROLLING VEHICLE STABILITY USING AIR SPRINGS

(71) Applicant: Torc Robotics, Inc., Blacksburg, VA (US)

(72) Inventors: Akshay Pai Raikar, Austin, TX (US);
Nicholas Atanasov, Austin, TX (US);
William Gray Davis, Austin, TX (US);
Pablo Smith, Spicewood, TX (US);
Armenio Jose Rivero, Austin, TX (US); Christopher Harrison, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 0 days.

(21) Appl. No.: 18/981,279

(22) Filed: Dec. 13, 2024

(51) Int. Cl.
 *B60G 17/015* (2006.01)
 *B60G 17/019* (2006.01)
 *B60G 17/052* (2006.01)

(52) U.S. Cl.
 CPC ....... *B60G 17/0155* (2013.01); *B60G 17/019* (2013.01); *B60G 17/0525* (2013.01); *B60G 2202/152* (2013.01)

(58) Field of Classification Search
 CPC .............. B60G 17/0155; B60G 17/019; B60G 17/0525
 See application file for complete search history.

(56) References Cited

U.S. PATENT DOCUMENTS

| | | | |
|---|---|---|---|
| 3,980,316 A | 9/1976 | Yates | |
| 4,634,142 A | 1/1987 | Woods et al. | |
| 6,354,617 B1 | 3/2002 | Behmenburg et al. | |
| 6,799,768 B2 | 10/2004 | Jin | |
| 6,898,501 B2 * | 5/2005 | Schubert | B60G 17/0195 381/71.4 |
| 7,040,632 B2 | 5/2006 | Burdock et al. | |
| 7,104,560 B2 | 9/2006 | Momiyama | |
| 7,611,154 B2 * | 11/2009 | Delaney | B60G 17/0195 280/6.154 |
| 9,085,210 B2 | 7/2015 | Yellambalase et al. | |
| 10,017,023 B2 | 7/2018 | Albers et al. | |
| 10,913,322 B2 * | 2/2021 | Vaughan | B60G 17/0155 |
| 10,967,698 B2 | 4/2021 | De Carteret et al. | |
| 11,511,587 B2 | 11/2022 | Tuhro | |
| 11,685,216 B2 * | 6/2023 | Akcam | B60G 17/0155 280/124.16 |
| 2017/0225536 A1 | 8/2017 | Kurita | |
| 2019/0168565 A1 | 6/2019 | Dolan et al. | |
| 2021/0039469 A1 * | 2/2021 | Vaughan | B60G 17/0525 |
| 2023/0294471 A1 | 9/2023 | Yamazaki | |

\* cited by examiner

*Primary Examiner* — Faye M Fleming
(74) *Attorney, Agent, or Firm* — McCarter & English, LLP (57) ABSTRACT

A vehicle air spring system and methods for controlling vehicle stability using air springs is provided. The vehicle air spring system includes an arrangement of air springs, pressure sensors, one or more air sources, air lines, and air valves that are monitored and regulated by an air pressure and stability control system. The air pressure and stability control system can be configured to utilize pressure sensor data, vehicle driving sensor data, and vehicle stability data to regulate the air pressure of the air springs and stabilize the vehicle. Additionally, the air pressure and stability control system can proactively adjust the air pressure of the air springs in anticipation of a potentially destabilizing event.

20 Claims, 7 Drawing Sheets

VEHICLE AIR SPRING SYSTEM AND METHODS FOR CONTROLLING VEHICLE STABILITY USING AIR SPRINGS

TECHNICAL FIELD

The present disclosure relates generally to the field of vehicle stability and control systems. Specifically, the present disclosure relates to an air spring system and methods for controlling the same, including a system and methods for compensating for vehicle rollover.

BACKGROUND

Vehicles utilize a number of systems to provide a stable platform for safe and smooth operations. One of the primary systems utilized by a vehicle to provide stability is the suspension system. Suspension systems enable a vehicle to maintain steady and predictable contact with the road surface, as well as helping to control the load being carried by the vehicle. One of the main components of a vehicle suspension system is the system of springs and shocks that help control motion of the vehicle. Vehicle spring systems employ a variety of spring designs, including both coil springs and air springs. In suspension systems that utilize air springs, the suspension is often adaptable by increasing or decreasing the pressure in the air springs according to the vehicle and the load being carried by the vehicle. In some cases, the air springs may be reactive to the road conditions and the physical forces exerted on the vehicle as the vehicle is in motion. However, current air spring systems are either passive (i.e. preset and not adaptable) or reactive, which leaves the vehicle vulnerable to destabilizing events (also referred to as destabilizing conditions), as the vehicle and the suspension system is only able to counteract a destabilizing event as or after it occurs.

Accordingly, there exists a need for an air spring suspension system for a vehicle that is proactive and dynamically adaptable, as well as the capability to monitor for and anticipate potentially destabilizing events, including conditions that may lead to vehicle rollover or loss of control.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

The present disclosure relates to a vehicle air spring system and methods for controlling vehicle stability using air springs.

In accordance with aspects of the present disclosure, an air spring system for a vehicle is provided. The air spring system comprises (i) a plurality of air springs each having a pressure sensor, wherein each of the air springs is configured to be variably pressurized to stabilize the vehicle and (ii) an air pressure and stability control system. The air pressure and stability system comprises (a) an air source supplying air to the air spring system, (b) a plurality of air valves for adjusting air pressure within the air springs, and (c) a controller coupled to the air valves, the air source, and a computing system of the vehicle. The controller is configured to (1) monitor the air pressure in each of the air springs by receiving air pressure data from the pressure sensor of each of the air springs, wherein monitoring the air pressure includes establishing a baseline air pressure, (2) receive vehicle stability data from the computing system of the vehicle, (3) monitor for a destabilizing event based on the vehicle stability data, wherein the vehicle stability data includes vehicle sensor data from one or more vehicle sensors including, RADAR, LiDAR, a camera, a wind sensor, and an inertial measurement unit, (4) determine an air pressure adjustment to counteract the destabilizing event, wherein the air pressure adjustment is based on the vehicle stability data, and (5) send an air pressure adjustment command to one or more of the air valves to adjust the air pressure in the air springs to an adjusted air pressure.

In some aspects, the vehicle stability data comprises load plan data, route data, and outside vehicle data. The route data may include data from one or more data sources including route map data and weather data. The outside vehicle data includes data from one or more remotely located vehicles.

In some aspects, the destabilizing event is a predicted destabilizing event and the air pressure adjustment is determined proactively and the air pressure adjustment command is sent before the predicted destabilizing event. In such aspects, the predicted destabilizing condition may be based, at least in part, on route data.

In some aspects, the controller of the air spring system is further configured to monitor for a conclusion of the destabilizing event. In such aspects, the controller may be further configured to return the air pressure to the baseline air pressure at the conclusion of the destabilizing event.

In some aspects, each of the air springs is adjusted by one of the air valves.

In some aspects, the air source includes one or more air compressors, one or more air tanks, or a combination thereof.

In accordance with aspects of the present disclosure, a method for controlling an air spring system of a vehicle is provided. The method involves monitoring air pressure in one or more air springs by receiving air pressure data from a pressure sensor of each of the air springs, wherein monitoring the air pressure includes establishing a baseline air pressure, receiving vehicle stability data from a computing system of the vehicle, monitoring for a destabilizing event based on the vehicle stability data, wherein the vehicle stability data includes vehicle sensor data from one or more vehicle sensors including, RADAR, LiDAR, a camera, a wind sensor, and an inertial measurement unit, determining an air pressure adjustment to counteract the destabilizing event, wherein the air pressure adjustment is based on the vehicle stability data, and sending an air pressure adjustment command to one or more of air valves to adjust the air pressure in the air springs to an adjusted air pressure.

In some aspects, the method also includes proactively adjusting the air pressure of the air springs in anticipation of a predicted destabilizing condition. The predicted destabilizing condition may be based on route data.

In some aspects, the method also includes determining the air pressure adjustment proactively and sending the air pressure adjustment command before the predicted destabilizing event.

In some aspects, the method also includes monitoring for a conclusion of the destabilizing event. In such aspects, the method may further include returning the air pressure to the baseline air pressure at the conclusion of the destabilizing event.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Corresponding reference numbers or characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

As described herein, an air spring and stability control system for a vehicle, including methods for controlling the same. In various embodiments, the air spring and stability control system utilizes a plurality of air springs, air valves, and pressure sensors, as well as an air pressure and stability control system, to manage air pressure within the air springs and, in turn, control the stability of the vehicle. In an example embodiment, the air spring and stability control system utilizes air pressure data from pressure sensors to control air valves and thereby regulate air pressure within each of the air springs. Air pressure within an air spring can be increased by adding air to the air spring from an air source that is also part of the air spring and stability control system. Conversely, air pressure within an air spring can be decreased by releasing (or exhausting) air from the air spring. Various embodiments in the present disclosure are described with reference to FIGS. 1-6 below.

In an example embodiment, air pressure within an air spring is adjusted by opening or closing one or more air valves that are in airflow communication with the air spring. Airflow communication means two or more components being connected or linked in a manner that enables air to flow or otherwise move through or between those connected components, such that the air is conveyed from a first of the connected components to a last of the connected components. Embodiments of the present disclosure contemplate arrangements where there are multiple arrangements for the air valves of the air spring and stability control system. For example, the air spring and stability control system could utilize separate air valves in airflow communication with an air spring to regulate air pressure within the air spring, with a first air valve for controlling the flow of air into the air spring for increasing air pressure within the air spring and (ii) a second air valve for releasing (or exhausting) air from the air spring for decreasing air pressure within the air spring. Alternatively, the air spring and stability control system could utilize a single air valve in airflow communication with an air spring to regulate air pressure within the air spring, with the single air valve being selectively actuated to either add air to the air spring or release (or exhaust) air from the air spring to achieve the desired air pressure. Additionally, embodiments of the present disclosure contemplate that the air valves could be either (i) integrated with an air spring itself or (ii) a separate component connected to an air spring with an air line (i.e. airflow communication).

Figure 1:
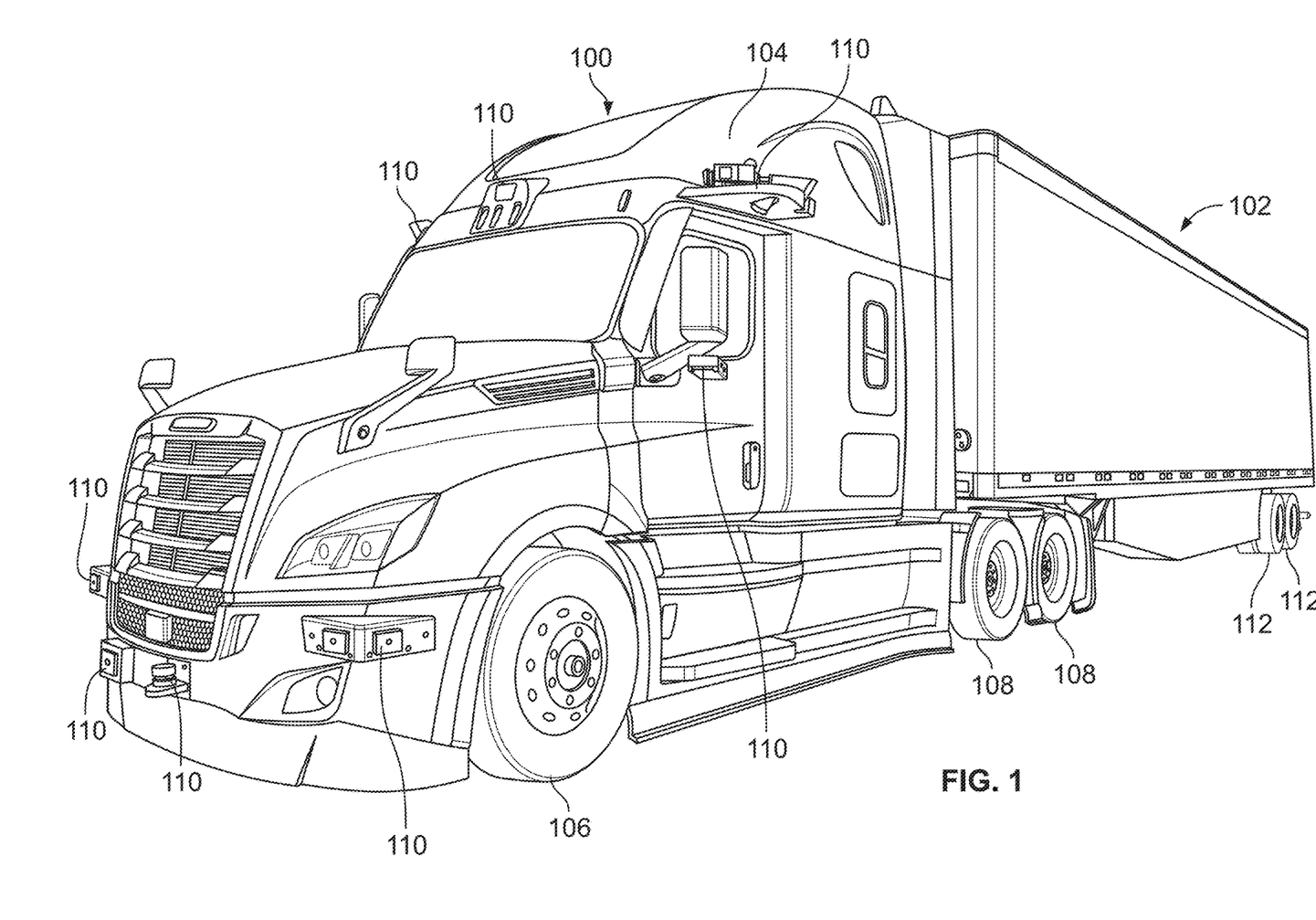
FIG. 1 is a perspective view of a vehicle with a trailer attached thereto, in accordance with an embodiment of the present disclosure.
Figure 4:
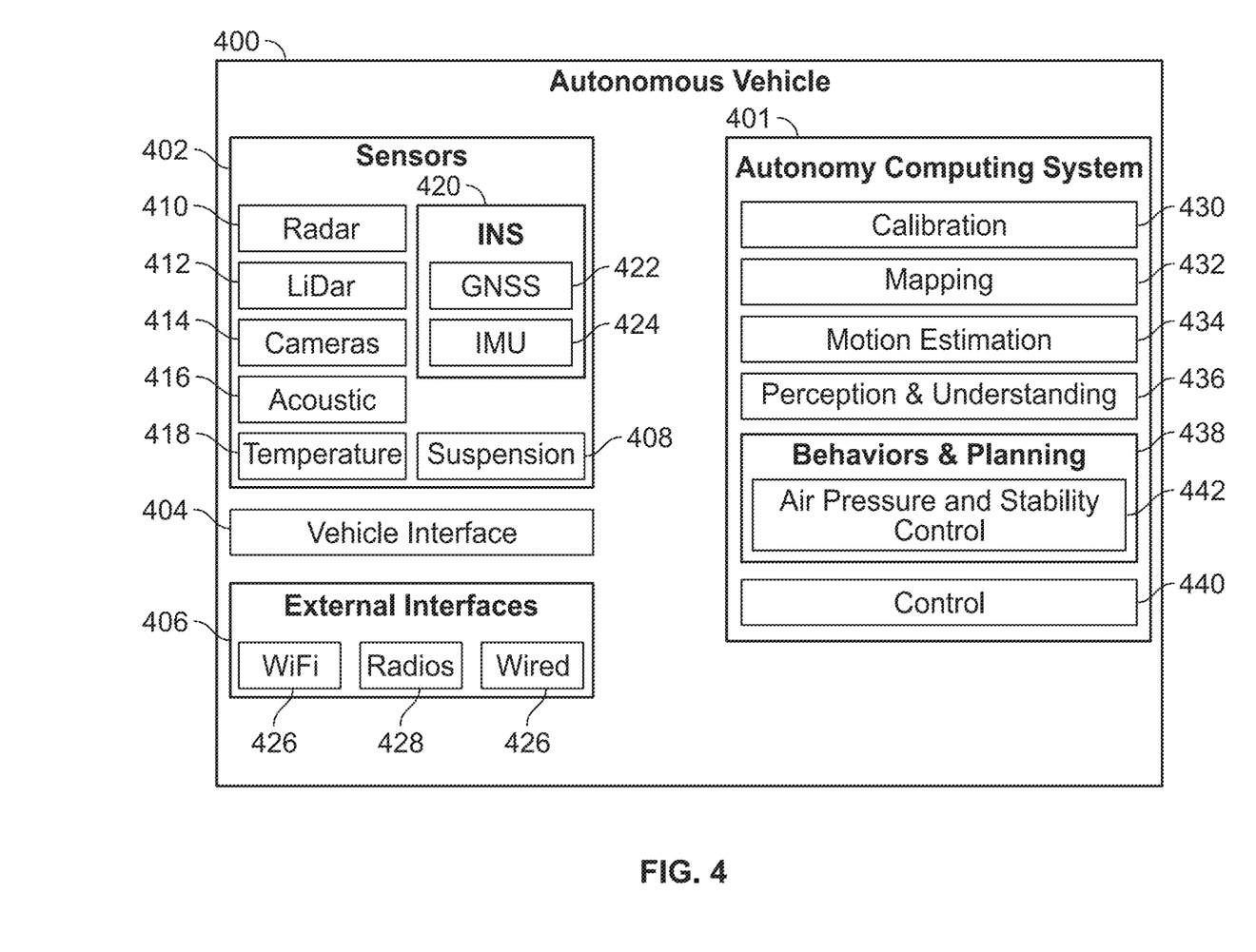
FIG. 4 is a block diagram of an example autonomous vehicle.

FIG. 1 is a perspective view of a vehicle 100, such as a truck that may be connected to a trailer 102 to transport the trailer 102 to a desired location. The vehicle 100 includes a cabin 104 that can be supported, and steered in the required direction, by front wheels 106 and rear wheels 108 that are shown in FIG. 1. The front wheels 106 are positioned by a steering system that includes a steering wheel and a steering column (not shown). The steering wheel and the steering column may be located in the interior of cabin 104. The vehicle 100 may be an autonomous vehicle (e.g. 400 as shown in FIG. 4), in which case the vehicle 100 may omit the steering wheel and the steering column to steer the vehicle 100. Rather, the vehicle 100 may be operated by an autonomy computing system (e.g. 401 as shown in FIG. 4) of the vehicle 100 based on data collected by a sensor network including one or more sensors, e.g., sensors 110 shown in FIG. 1 or sensors 402 shown in FIG. 4. The trailer 102 can include a plurality of wheels 112 that support the trailer 102. In an example embodiment, at least the air springs (e.g. 202 as shown in FIG. 2) of the air spring and stability control system for a vehicle (e.g. 200 as shown in FIG. 2) can be equipped on the axles for any of the front wheels 106 or rear wheels 108 of the vehicle, as well as the axles for any of the wheels 112 of the trailer 102.

Figure 2:
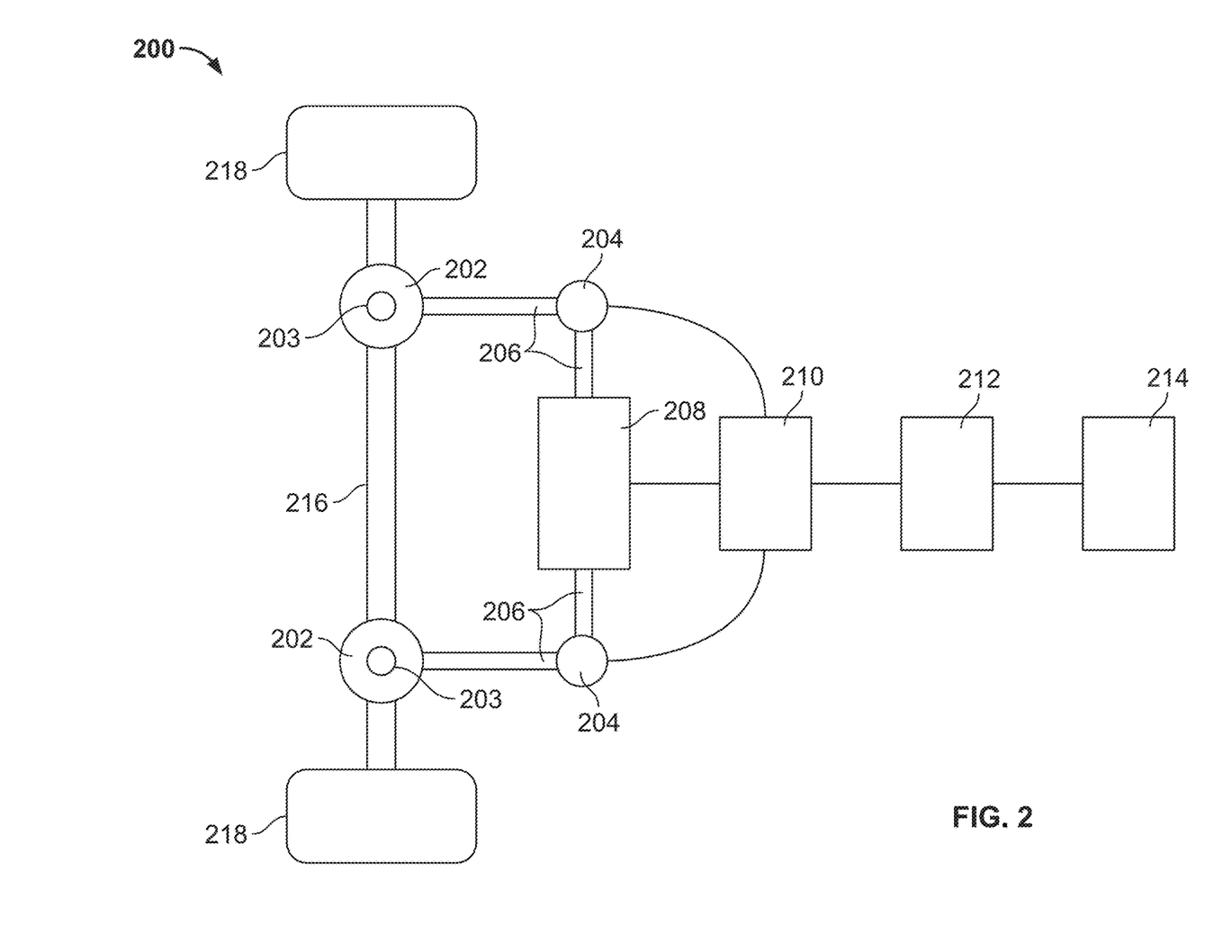
FIG. 2 is a schematic view of an air spring system for a vehicle and control system therefore, in accordance with an embodiment of the present disclosure.

FIG. 2 is a schematic view of an air spring system for a vehicle and control system therefore, in accordance with an embodiment of the present disclosure. For the purposes of the present disclosure, a vehicle could be any type of powered vehicle (e.g. a truck, car, etc.) or unpowered vehicle (e.g. trailer), with the air spring system and control system (e.g. as shown in FIG. 2) being adaptable for use with any such vehicle. In the example embodiment, the air spring system for a vehicle and control system therefor (or the air spring system) 200 includes, but is not limited to, a plurality of air springs 202, a plurality of air valves 204, air lines 206, one or more air sources 208, a controller 210, a vehicle computer 212, and one or more vehicle sensors 214. Each air spring 202 includes a pressure sensor 203 to monitor and measure the air pressure within the air spring 202. The pressure sensor 203 monitors and measures the air pressure to output air pressure data to one or more of the controller 210 and vehicle computer 212. The controller 210 and vehicle computer 212 may be a part of the air spring and stability control system 200 itself. Alternatively, the controller 210 and vehicle computer 212 may be the controller and computer of the vehicle. For example, in an autonomous vehicle (e.g. 400 as shown in FIG. 4), the air spring and stability control system 200 may utilize the control 440 and autonomy computing system 401 of the autonomous vehicle 400. The example embodiment includes one or more air sources 208 that are connected to the air spring (i.e. airflow communication) by an air line 206. An air source 208 may be an air compressor, an air tank, or a combination thereof. Air pressure within the air spring 202 is increased by inflating the air spring 202 with air from the air source 208. Airflow between the air source 208 and air spring 202 is regulated by an air valve 204. In the example embodiment, the air valve 204 is connected between the air spring 202 and air source 208 by air lines 206. However, in some embodiments, the air valve may be integrated with the air spring 202. Air pressure within the air spring 202 is decreased by deflating the air spring 202 by releasing (or exhausting) air from the air spring 202. Airflow out of the air spring 202 is regulated by an air valve 204. In the example embodiment, the air valve 204 is connected to the air spring 202 by an air line 206. However, in some embodiments, the air valve may be integrated with the air spring 202.

In example embodiments, each air spring 202 includes a pressure sensor 203 that monitors and measures the air pressure within the air spring to output air pressure data to one or more of the controller 210 and vehicle computer 212. In turn, the controller 210 and/or vehicle computer 212 process the air pressure data to establish a baseline air pressure. The baseline air pressure is the air pressure of the air springs when the vehicle is not experiencing a destabilizing condition (i.e. standard air pressure) and is operating in a stable condition without any air pressure adjustment. For example, the baseline air pressure may be the air pressure established and measured after initial loading (i.e. an initial load plan) is complete and before the vehicle departs on its route. Additionally, the controller 210 and/or vehicle computer 212 process the air pressure data along with the vehicle stability data to determine an appropriate, if any, air pressure adjustment (i.e. adjusted air pressure) for each air spring 202. Upon determining an appropriate air pressure adjustment, the controller 210 and/or vehicle computer 212 send a pressure adjustment command to one or more air valves 204 and, if inflation of an air spring 202 is necessary, an air source 208. The pressure adjustment command activates each respective air valve 204, and potentially the air source 208, to adjust the air pressure within each air spring 202 to an adjusted air pressure as needed to stabilize the vehicle. For example, a pressure adjustment command to increase air pressure within one or more air springs 202 includes (i) activating the air source 208 and (ii) activating (i.e. opening) the air valve 204 for each of the respective air springs 202 to enable inflation of those air springs 202 by the air source 208. When the desired air pressure increase is achieved, the air source 208 and respective air valves 204 are deactivated (i.e. closed). Alternatively, a pressure adjustment command to decrease air pressure within one or more air springs 202 includes activating (i.e. opening) the air valve 204 for each of the respective air springs 202 to enable deflation of those air springs 202. When the desired air pressure decrease is achieved, the respective air valves 204 are deactivated (i.e. closed). Furthermore, the controller 210 and/or vehicle computer 212 can process the air pressure data and the vehicle stability data to determine when a destabilizing condition has ended. After the destabilizing condition has ended, the air springs 202 can be returned to the base air pressure by inflating and deflating the air springs 202 accordingly.

Additionally, example embodiments of the present disclosure contemplate multiple possible arrangements of air valves. For example, each air spring could be in airflow communication with one (1) air valve regulating both inflation and deflation of the air spring. Alternatively, each air spring could be in air flow communication with two (2) air valves, with a first air valve regulating inflation of the air spring and a second air valve regulating deflation of the air spring. Additionally, embodiments of the present disclosure could be configured such that a single air valve regulates multiple air springs. For example, one (1) air valve could be in airflow communication with multiple air springs and regulate both the inflation and deflation of those multiple air springs. Alternatively, there could a first air valve regulating the inflation of multiple air springs and a second air valve regulating the deflation of those multiple air springs.

In example embodiments, the air springs 202 of the air spring system 200 can be equipped on any axle 216 of the vehicle. In some embodiments, there are one or more air springs 202 at each end of the axle 218. Adjustments to the air springs 202 can shift or alter the axle load experienced by each end of the axle 218 and thereby the wheel load experienced by each wheel 218 attached to the axle 216. Equally, adjustments to the air springs 202 can be utilized to shift the total load weight of the vehicle between multiple axles 216 and wheels 218 as may be desired.

In example embodiments, the air spring and stability control system for a vehicle, including methods for controlling the same, are collectively adapted to prevent, limit, or otherwise counteract destabilizing conditions that could cause the vehicle experience a rollover, loss of control, or accident. Moreover, the air spring and stability control systems and methods provided herein include proactive systems and methods that can preemptively address potentially destabilizing conditions before such conditions occur, including by adjusting the air spring and stability control system of the vehicle to prepare for a destabilizing condition before the destabilizing condition occurs. The proactive approach utilizing preemptive adjustments to the air spring and stability control system enables the vehicle to more effectively prevent rollover, loss of control, or accidents that impact the safety of the vehicle. In the example embodiments, control logic operates a system of air springs and air valves to regulate air pressure within the air springs by inflating or deflating the air springs. In adjusting the air pressure within the air springs, it is possible to compensate (proactively or reactively) for a destabilizing condition.

A destabilizing condition (also referred to as a destabilizing event) can be active or presently occurring, such that the vehicle is presently experiencing the destabilizing condition and the air spring and stability control system must react to such destabilizing condition by adjusting the air pressure within the air springs to stabilize the vehicle. A destabilizing condition can also be predicted or expected, such that the air spring and stability control system is anticipating an impending or potential destabilizing condition and the air spring and stability control system may be proactive to adjust the air pressure within the air springs to prepare the vehicle to stabilize the vehicle before the destabilizing condition is experienced. Additionally, in certain circumstances, proactive or preemptive adjustment of the air springs may be preferred to provide (i) a more gradual and controlled adjustment of the air springs and/or (ii) more time to achieve the desired adjustment of the air springs due to maximum inflation and deflation rates of the air springs, air valves, air lines, and/or air sources. Proactive or preemptive adjustment of the air springs can help improve vehicle stability and make vehicle stability more predictable compared to circumstances where the air spring and stability control system is reactive. For example, proactive or preemptive adjustment of the air springs may allow for a more gradual and controllable change in weight transfer or shift in the vehicle's center of gravity, as the air spring and stability control system is preparing for a destabilizing condition from a stable condition. Conversely, a reactive adjustment of the air springs, as may be required when actively experiencing a destabilizing condition, can require a more rapid change in weight transfer or shift in the vehicle's center of gravity, which may be more difficult to control, to more quickly return the vehicle to a stable condition.

In example embodiments, the air spring and stability control system for a vehicle, including methods for controlling the same, are useful for counteracting any number of destabilizing conditions (or destabilizing events). Examples of destabilizing conditions include, but are not limited to, (i) wind and weather conditions, (ii) driving route conditions, (iii) road conditions, (iv) vehicle load conditions, and (v) vehicle maneuvers. Wind and weather conditions include any meteorological conditions or events that may impact the stability of a vehicle. For example, vehicles having body panels with large surfaces areas can be negatively impacted by crosswinds, as the crosswind can apply forces on the vehicle that cause the vehicle to tilt to one side. Driving route conditions include features of the route a vehicle will travel including, but not limited to, (i) grade or elevation changes, (ii) sharp curves, and (iii) other terrain related features. For example, sharp curves can cause a destabilizing condition as the vehicle navigates the curve. However, the air spring and stability control system can preemptively adjust the air springs to limit any destabilization and enable the vehicle to navigate the sharp curve safely. Road conditions include conditions related to the road surface. For example, is the road surface (i) banked or slopped, (ii) rough, potholed, rutted, or otherwise uneven, or (iii) slippery (e.g. due to water, ice, or foreign substance), as well as the type of road surface (e.g. concrete, asphalt, dirt, etc.). Vehicle load conditions include information about the load being carried by the vehicle including, but not limited to, (i) the type/nature of the load (e.g. items having uniform, size, shape and weight/density vs. items having irregular size, shape, and weight/density vs. liquid, etc.), (ii) how the load is arranged and secured (i.e. load plan), (iii) a shift in the load due to another destabilizing condition, and (iv) the impact on the foregoing on vehicle's center of gravity. For example, items having irregular weight/density may result in a load that is not evenly or ideally distributed across all of the vehicle's axles, thereby making certain portions of the vehicle more prone to destabilization than other portions. Vehicle maneuvers include movements of the vehicle that may destabilize the vehicle, including turns, lane changes, and speed changes, in each case whether such movement is presently occurring or expected to occur.

In example embodiments, the air spring and stability control system for a vehicle, including methods for controlling the same, may utilize at least vehicle stability data, together with air pressure data, to regulate the inflation and deflation of the air springs and control the stability of the vehicle. The vehicle stability data includes, but is not limited to, vehicle sensor data, load plan data, route data, and outside vehicle data. In an example embodiment, the vehicle sensor data includes, but is not limited to, data and information from the vehicle sensors 402 (as further discussed below). In an example embodiment, the load plan data is data about the load being carried by the vehicle. For example, the load plan data may include (i) the nature of the load including, but not limited size, shape, weight, form (solid, liquid, etc.), etc.) (ii) how the load is arranged and secured (i.e. load plan) on the vehicle, and (iii) center of gravity information. The load plan data may be updated as deliveries and pick-ups are made. In an example embodiment, the route data includes route map data, which includes data and information about the route a vehicle is traveling on including, but not limited to, (i) road curves and turns, (ii) grade and elevation changes, (iii) lane width, and (iv) overhead clearance. The route data can also include weather data. Weather data may include both (i) real-time data regarding any meteorological conditions the vehicle may encounter along its route and (ii) historical meteorological data regarding certain prevailing or common meteorological conditions a vehicle may encounter along its route. In the example embodiment, route data may be received by the air spring and stability control system from an external data source via a network.

Outside vehicle data may include data and information from remotely located vehicles and data sources. For example, outside vehicle data may include data and information from a fleet of vehicles (i.e. one or more outside vehicles) that are interconnected via a data network. In the example embodiment, data and information can be transmitted among a fleet of vehicles such that a vehicle in one location can provide can provide information to other vehicles that may be approaching or be routed through that same location. The outside vehicle data may include real-time updates to route map data and weather data. In some embodiments, outside vehicle data may include data and information from a database, including preferred pressure adjustment commands and patterns collected and learned by the fleet of vehicles over time. For example, the fleet of vehicles can send data to a database connected to the data network regarding pressure adjustment commands executed by a vehicle and the conditions under which such pressure adjustment commands were issued. Over time, by applying machine learning to such data, the vehicles in the fleet will become more effective at anticipating and responding to destabilizing conditions, as the vehicles will be able to rely on past events to instruct future behavior.

In example embodiments, the air springs of the air spring and stability control system for a vehicle, can be selectively inflated and deflated to provide stability control for the vehicle when the vehicle is experiencing or expecting to experience a destabilizing condition. The air spring and stability control system can provide lateral or longitudinal stability to the vehicle. As an illustrative example, when a vehicle is traveling along a curve in the road, centrifugal force will be exerted on the vehicle. The centrifugal force exerted will increase with both the speed of the vehicle (i.e. increase in speed of the vehicle) and the curvature of the road (i.e. decrease in radius of the curve). With a sufficient enough centrifugal force, the vehicle will lean or roll away from the center of the curve. At a certain threshold, the large centrifugal forces acting on the vehicle will create such instability in the vehicle that the wheels of the vehicle will lose contact with the road and ultimately cause a rollover. A vehicle's ability to resist a rollover increases as the stiffness of the suspension increases and the center of gravity lowers (i.e. moves vertically to be closer to the ground). With an air spring suspension, increasing the pressure of (inflating) an air spring increases the associated air spring's stiffness, while decreasing the pressure of (deflating) an air spring decreases the associated air spring's stiffness. In an illustrative example, the air spring and stability control system can counteract the vehicle's roll by (i) decreasing the pressure of (deflating) the air springs on the side of the vehicle at the inside of the curve, (ii) increasing the pressure of (inflating) the air springs on the side of the vehicle at the outside of the curve, or (iii) a combination thereof. As another illustrative example, the air spring and stability control system can respond analogously when the vehicle is experiencing crosswinds. In that illustrative example, the air spring and stability control system can counteract the vehicle's roll by (i) decreasing the pressure of (deflating) the air springs on windward the side of the vehicle, (ii) increasing the pressure of (inflating) the air springs on the leeward side of the vehicle, or (iii) a combination thereof. In the illustrative examples, the adjustment of the air springs could be performed preemptively based on route data (i.e. road curve example) or weather conditions (i.e. crosswind example). As a further illustrative example, the air spring and stability control system can provide longitudinal stability to the vehicle, which may be useful controlling weight transfer of the vehicle's load and maintaining equal traction at all wheels of the vehicle. In that illustrative example air springs at the front and rear of the vehicle can be selectively inflated and deflated during acceleration and deceleration to help control weight transfer. During acceleration, rearward weight transfer can be counteracted by (i) decreasing the pressure of (deflating) the air springs at the front of the vehicle, (ii) increasing the pressure of (inflating) the air springs at the rear of the vehicle, or (iii) a combination thereof. Correspondingly, during deceleration, frontward weight transfer can be counteracted by (i) decreasing the pressure of (deflating) the air springs at the rear of the vehicle, (ii) increasing the pressure of (inflating) the air springs at the front of the vehicle, or (iii) a combination thereof.

In an example embodiment, the air spring and stability control system for a vehicle 200 may include or utilize one or more sensors 214 to collect and assess vehicle stability data, as well as aid in controlling the air springs and stability of the vehicle. Those one or more sensors 214 may be a part of the air spring and stability control system 200 itself. Alternatively, the sensors 214 may be the sensors of the vehicle. For example, in an autonomous vehicle (e.g. 400 as shown in FIG. 4), the air spring and stability control system 200 may utilize the computing system and sensors of the autonomous vehicle (e.g. 401 and 402 as shown in FIG. 4). For example, the sensors 214 of the air spring and stability control system 200 may include a variety of optical and measuring sensors to assess features of a road that may impact stability of the vehicle. In an illustrative example, the air spring and stability control system 200 may use a camera or LiDAR to measure curves in a road. Similarly, the air spring and stability control system 200 may utilize a global navigation satellite system to generate route map data. One of ordinary skill in the art would appreciate that there are any number of sensors that might be utilized by the air spring and stability control system 200 to collect and assess vehicle stability data and embodiments of the present disclosure are contemplated for use with any such sensors.

Figure 3A:
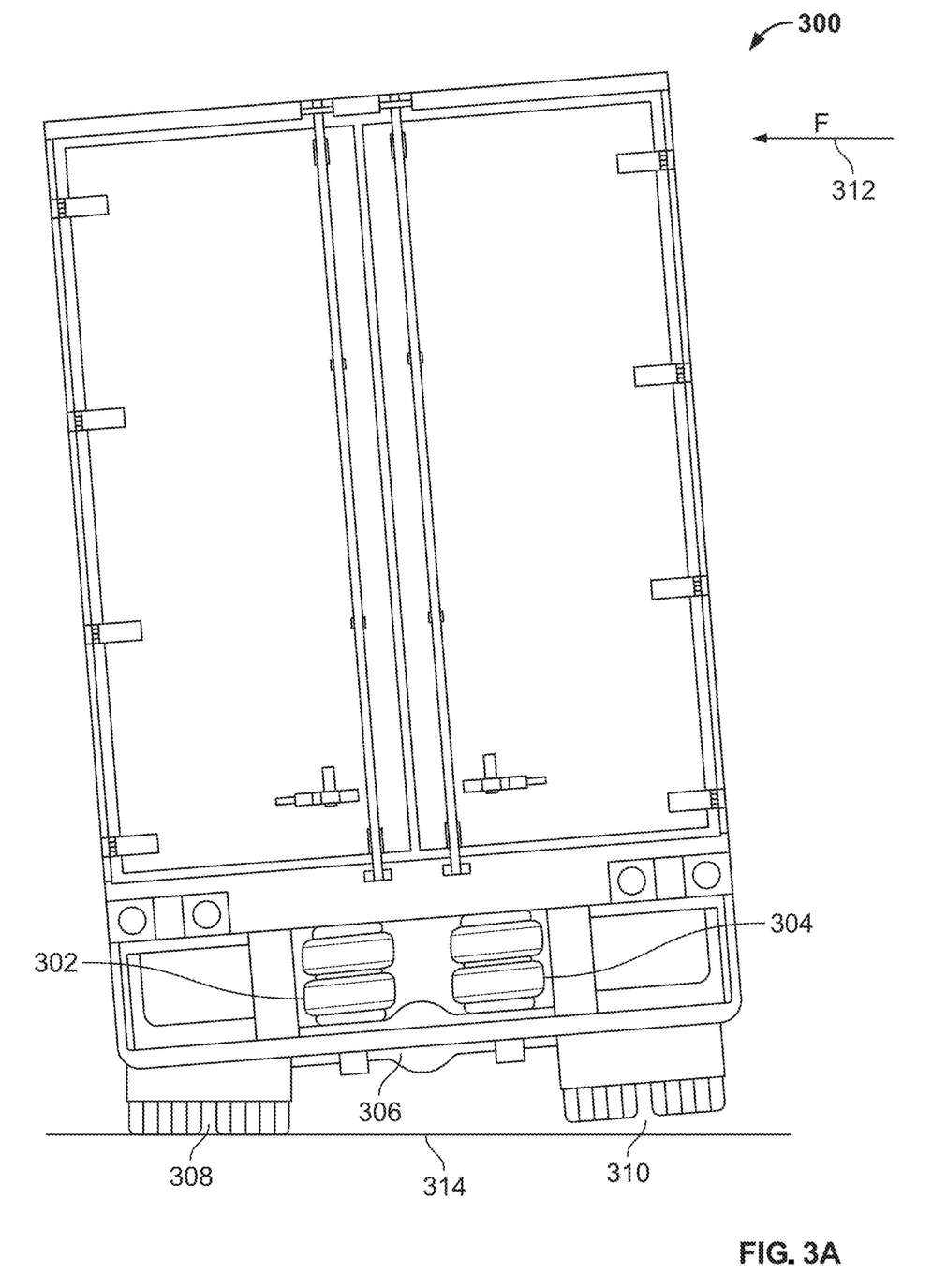
FIG. 3A is a rear view of a trailer with an air spring system where the trailer is experience a force, in accordance with an embodiment of the present disclosure.
Figure 3B:
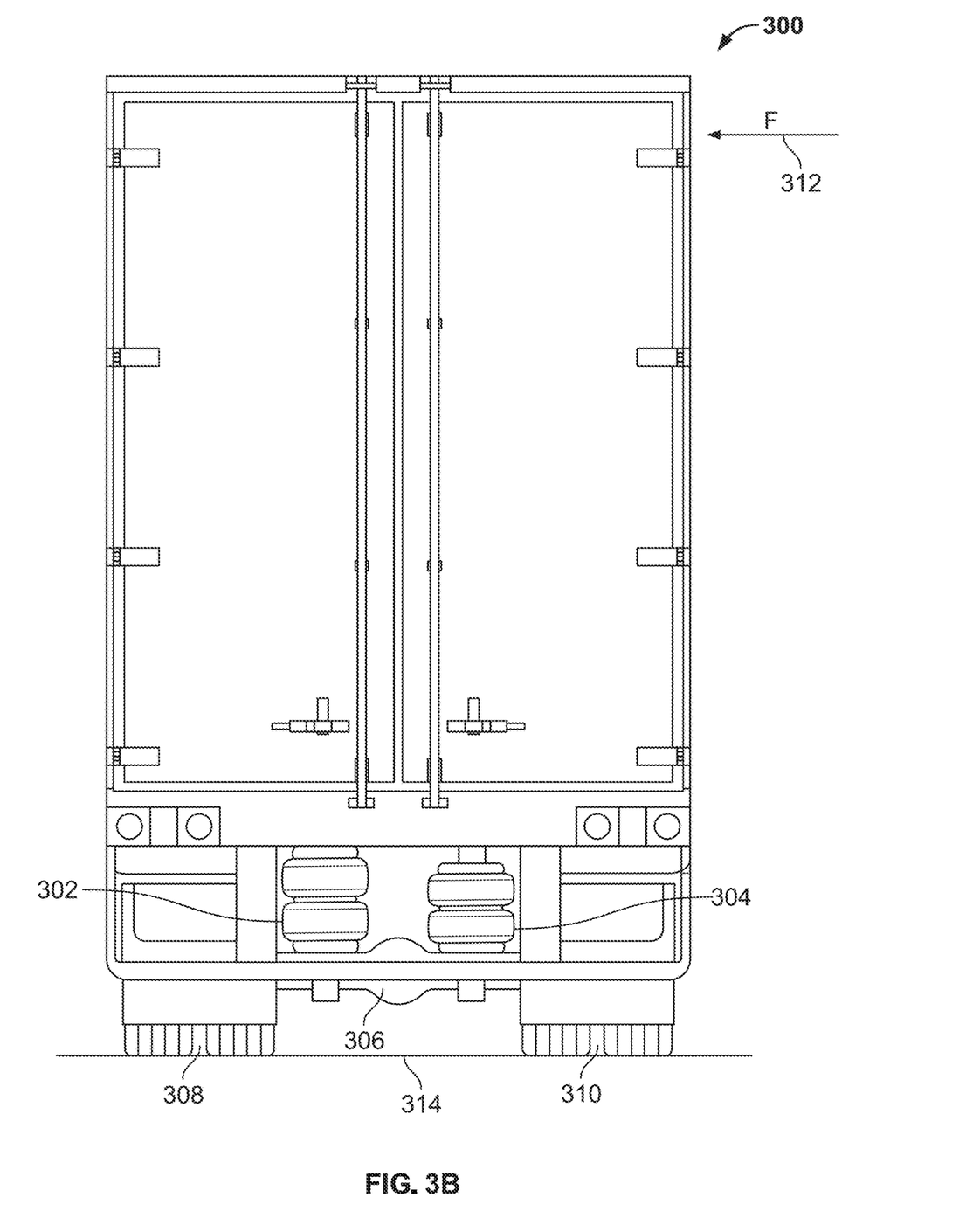
FIG. 3B is a rear view of a trailer with an air spring system where the air spring system is counteracting the force shown in FIG. 3A, in accordance with an embodiment of the present disclosure.

FIGS. 3A and 3B are rear views of a trailer with an air spring and stability control system, in accordance with an embodiment of the present disclosure. As shown in FIG. 3A, the vehicle 300 is experiencing a destabilizing condition. The destabilizing condition exerts a force (F) 312 on the vehicle 300, which causes the vehicle 300 to begin rolling to one side. Without correction, there is the possibility that the force (F) 312 would become so great that the force (F) 312 would cause the vehicle 300 (i) to rollover or (ii) become so unstable that control of the vehicle 300 is lost. As shown in FIG. 3B, the air spring and stability control system is configured to counteract the force (F) 312 and stabilize the vehicle 300. In an example embodiment, there is a first air spring 302 on a first side of the axle 306 and second air spring 304 on a second side of the axle 306. To counteract the force (F) 312, the air spring and stability control system is configured to inflate and increase the air pressure of the first air spring 302 and/or deflate and decrease the air pressure of the second air spring 304. These adjustments counteract the rolling motion caused by the force (F) 312 and thereby stabilize the vehicle and prevent a rollover or other loss of control. In stabilizing the vehicle 300, the air spring and stability control system aims to maintain optimal contact between the wheels 308, 310 and the road surface 314, as well as optimally balance the load of vehicle 300 across the axle 306 so that the load is carried to the road surface equally by both wheels 308, 310.

FIG. 4 is a block diagram of an autonomous vehicle 400. The vehicle 100 shown in FIG. 1 could be configured as an autonomous vehicle 400. In the example embodiment, the autonomous vehicle 400 includes an autonomy computing system 401, sensors 402, a vehicle interface 404, and external interfaces 406. For the sake of clarity, the air spring and stability control system (e.g. 200 as shown in FIG. 2) descried herein can be utilized on an autonomous vehicle.

In an example embodiment, sensors 402 may include various sensors such as, for example, suspension sensors 408, radio detection and ranging (RADAR) sensors 410, light detection and ranging (LiDAR) sensors 412, cameras 414, acoustic sensors 416, temperature sensors 418, or inertial navigation system (INS) 420, which may include one or more global navigation satellite system (GNSS) receivers 422 and one or more inertial measurement units (IMU) 424. Other sensors 402 not shown in FIG. 4 may include, for example, acoustic (e.g., ultrasound, microphones, etc.), internal vehicle sensors, meteorological sensors (including pressure sensors and wind sensors), or other types of sensors. Sensors 402 generate respective output signals based on detected physical conditions of autonomous vehicle 400 and its proximity. As described in further detail below, these signals may be used by autonomy computing system 401 to determine how to control operations of autonomous vehicle 400.

Cameras 414 are configured to capture images of the environment surrounding autonomous vehicle 400 in any aspect or field of view (FOV). The FOV can have any angle or aspect such that images of the areas ahead of, to the side, behind, above, or below autonomous vehicle 400 may be captured. In some embodiments, the FOV may be limited to particular areas around autonomous vehicle 400 (e.g., forward of autonomous vehicle 400, to the sides of autonomous vehicle 400, etc.) or may surround 360 degrees of autonomous vehicle 400. In some embodiments, autonomous vehicle 400 includes multiple cameras 414, and the images from each of the multiple cameras 414 may be processed to identify objects in the environment surrounding autonomous vehicle 400. In some embodiments, the image data generated by cameras 414 may be sent to autonomy computing system 401 or other aspects of autonomous vehicle 400. For example, the cameras 414 may be used by the air spring and stability control system 200 for the purposes of identifying curves in the road (and other driving route conditions) for the purposes of assessing a potentially destabilizing condition. Additionally, the cameras 414 could be used to identify features of the road (e.g. lane width, overhead clearance, side-to-side clearance, etc.) that may limit the maximum adjustment made to the vehicle by the air spring and stability control system 200 (i.e. avoid adjustments that may cause the vehicle to make contact with nearby obstacles).

LiDAR sensors 412 generally include a laser generator and a detector that send and receive a LiDAR signal such that LiDAR point clouds (or "LiDAR images") of the areas ahead of, to the side, behind, above, or below autonomous vehicle 400 can be captured and represented in the LiDAR point clouds. RADAR sensors 410 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from the RADAR sensors 410 and LiDAR sensors 412 may be used by the air spring and stability control system 200 in a similar manner as the cameras 414. For example, the RADAR sensors 410 and LiDAR sensors 412 could be used to identify (i) driving route conditions that could cause a destabilizing condition and (ii) features of the road that would require the air spring and stability control system 200 to limit the maximum adjustment to the vehicle.

GNSS receiver 422 is positioned on autonomous vehicle 400 and may be configured to determine a location of autonomous vehicle 400, which it may embody as GNSS data. GNSS receiver 422 may be configured to receive one or more signals from a global navigation satellite system (e.g., Global Positioning System (GPS) constellation) to localize autonomous vehicle 400 via geolocation. In some embodiments, GNSS receiver 422 may provide an input to or be configured to interact with, update, or otherwise utilize one or more digital maps, such as an HD map (e.g., in a raster layer or other semantic map). In some embodiments, GNSS receiver 422 may provide direct velocity measurement via inspection of the Doppler effect on the signal carrier wave. Multiple GNSS receivers 422 may also provide direct measurements of the orientation of autonomous vehicle 400. For example, with two GNSS receivers 422, two attitude angles (e.g., roll and yaw) may be measured or determined. In some embodiments, autonomous vehicle 400 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 400 and its environment. The GNSS receivers 422 may also be used to provide or supplement the route data. The route data can, in turn, be used by the air spring and stability control system 200 to make a proactive adjustment to the air springs 202 of the air spring and stability control system 200.

IMU 424 is a micro-electrical-mechanical (MEMS) device that measures and reports one or more features regarding the motion of autonomous vehicle 400, although other implementations are contemplated, such as mechanical, fiber-optic gyro (FOG), or FOG-on-chip (SiFOG) devices. IMU 424 may measure an acceleration, angular rate, or an orientation of autonomous vehicle 400 or one or more of its individual components using a combination of accelerometers, gyroscopes, or magnetometers. IMU 424 may detect linear acceleration using one or more accelerometers and rotational rate using one or more gyroscopes and attitude information from one or more magnetometers. In some embodiments, IMU 424 may be communicatively coupled to one or more other systems, for example, GNSS receiver 422 and may provide input to and receive output from GNSS receiver 422 such that autonomy computing system 401 is able to determine the motive characteristics (acceleration, speed/direction, orientation/attitude, etc.) of autonomous vehicle 400. The IMU 424 may also be used by the air spring and stability control system 200 to detect a destabilizing condition, especially an active or presently occurring destabilizing condition. Upon detecting a destabilizing condition, the air spring and stability control system 200 can utilize the data and measurements from the IMU 424 to determine the proper corrective action.

In the example embodiment, autonomy computing system 401 employs vehicle interface 404 to send commands to the various aspects of autonomous vehicle 400 that actually control the motion of autonomous vehicle 400 (e.g., engine, throttle, steering wheel, brakes, etc.) and to receive input data from one or more sensors 402 (e.g., internal sensors). External interfaces 406 are configured to enable autonomous vehicle 400 to communicate with an external network via, for example, a wired or wireless connection, such as Wi-Fi 426 or other radios 428. In embodiments including a wireless connection, the connection may be a wireless communication signal (e.g., Wi-Fi, cellular, LTE, 5G, Bluetooth, etc.).

In some embodiments, external interfaces 406 may be configured to communicate with an external network via a wired connection 444, such as, for example, during testing of autonomous vehicle 400 or when downloading mission data after completion of a trip. The connection(s) may be used to download and install various lines of code in the form of digital files (e.g., HD maps), executable programs (e.g., navigation programs), and other computer-readable code that may be used by autonomous vehicle 400 to navigate or otherwise operate, either autonomously or semi-autonomously. The digital files, executable programs, and other computer readable code may be stored locally or remotely and may be routinely updated (e.g., automatically, or manually) via external interfaces 406 or updated on demand. In some embodiments, autonomous vehicle 400 may deploy with all of the data it needs to complete a mission (e.g., perception, localization, and mission planning) and may not utilize a wireless connection or other connections while underway.

In an example embodiment, autonomy computing system 401 is implemented by one or more processors and memory devices of autonomous vehicle 400. Autonomy computing system 401 includes modules, which may be hardware components (e.g., processors or other circuits) or software components (e.g., computer applications or processes executable by autonomy computing system 401), configured to generate outputs, such as control signals, based on inputs received from, for example, sensors 402. These modules may include, for example, a calibration module 430, a mapping module 432, a motion estimation module 434, a perception and understanding module 436, a behaviors and planning module 438, a control module or controller 440, and an air pressure and stability control module 442. The air pressure and stability control module 442, for example, may be embodied within another module, such as behaviors and planning module 438, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 400.

The air pressure and stability control module 442 may perform one or more tasks including, but not limited to, receiving data from the suspension sensor 408. In an example embodiment, the suspension sensor 408 could include the pressure sensor of an air spring. The pressure sensor monitors and measures the air pressure within an air spring. Additionally, the suspension sensor 408 could be configured to cooperate with other of the sensors 402. The air pressure and stability control module 442 can use data from the suspension sensor 408 and other sensors 402, as well as vehicle stability, to adjust the air pressure of the air springs of the air spring and stability control system.

Autonomy computing system 401 of autonomous vehicle 100 may be completely autonomous (fully autonomous) or semi-autonomous. In one example, autonomy computing system 401 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 5:
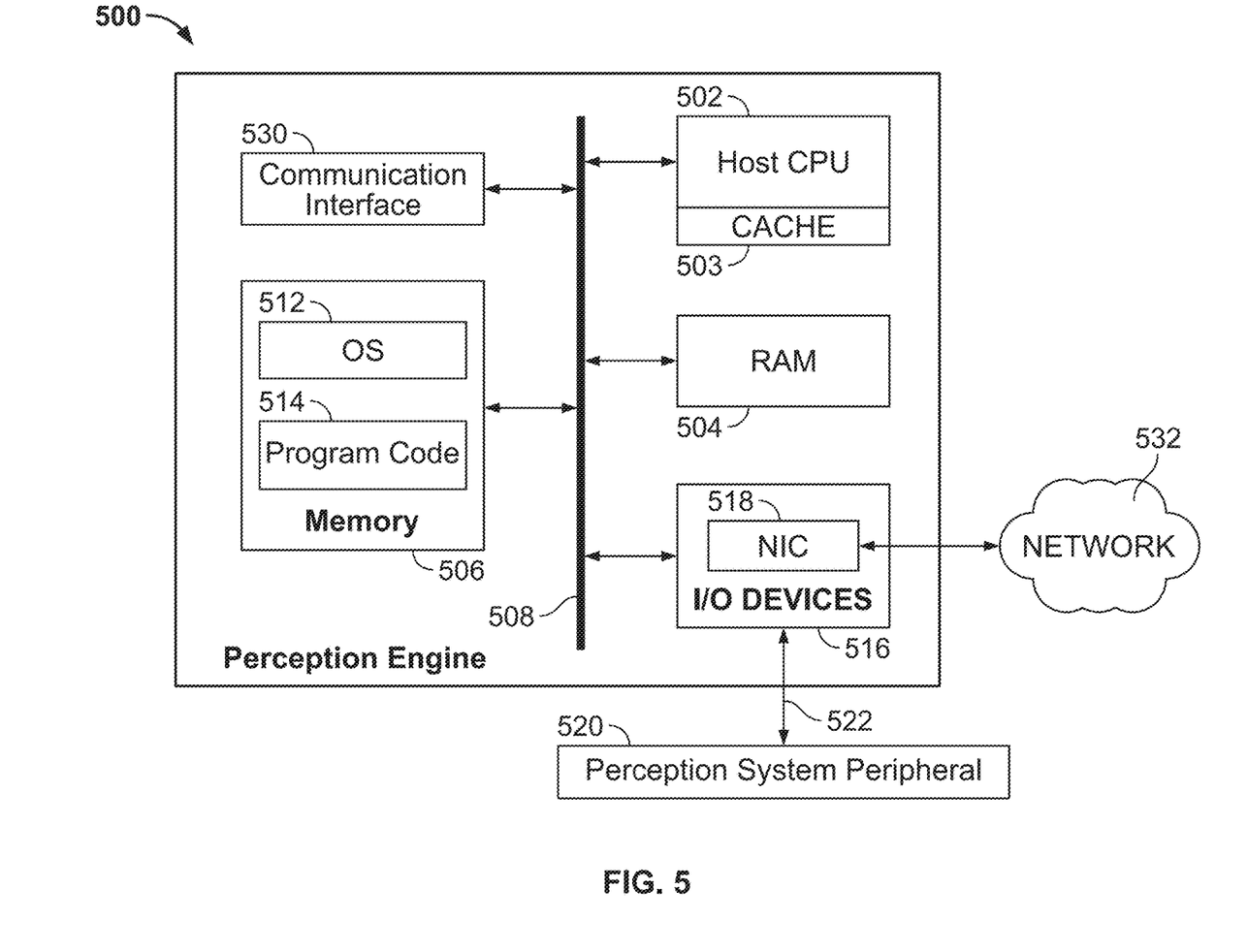
FIG. 5 is a block diagram of an example computing system.

FIG. 5 is a block diagram of an example computing system 500, such as the autonomy computing system 401 shown in FIG. 4, configured for sensing an environment in which an autonomous vehicle is positioned. Computing system 500 includes a CPU 502 coupled to a cache memory 503, and further coupled to RAM 504 and memory 506 via a memory bus 508. Cache memory 503 and RAM 504 are configured to operate in combination with CPU 502. Memory 506 is a computer-readable memory (e.g., volatile, or non-volatile) that includes at least a memory section storing an OS 512 and a section storing program code 514. Program code 514 may be one of the modules in the autonomy computing system 401 shown in FIG. 4. In alternative embodiments, one or more section of memory 506 may be omitted and the data stored remotely. For example, in certain embodiments, program code 514 may be stored remotely on a server or mass-storage device and made available over a network 532 to CPU 502.

Computing system 500 also includes I/O devices 516, which may include, for example, a communication interface such as a network interface controller (NIC) 518, or a peripheral interface for communicating with a perception system peripheral device 520 over a peripheral link 522. I/O devices 516 may include, for example, a GPU for image signal processing, a serial channel controller or other suitable interface for controlling a sensor peripheral such as one or more acoustic sensors, one or more LiDAR sensors, one or more cameras, or a CAN bus controller for communicating over a CAN bus.

The air spring and stability control system of the present disclosure may also include operational logic for controlling the air spring and stability control system. In an example embodiment, the control logic may be stored and executed by the air pressure and stability control module 442. In the example embodiment, the air spring and stability control system may be activated based at least in part on the processing of (i) vehicle stability data, (ii) air pressure data, or (iii) a combination thereof. In an example embodiment, the air pressure and stability control module 442 provides the control logic used to control the (i) air springs 202, (ii) air valves 204, and (iii) air sources 208 (as shown in FIG. 2). The air pressure and stability control module 442 may operate with or independently of the controller 440. Each of the controller 440 and the air pressure and stability control module 442 may can be configured to control the air spring and stability control system (e.g. as shown in FIG. 2).

Figure 6:
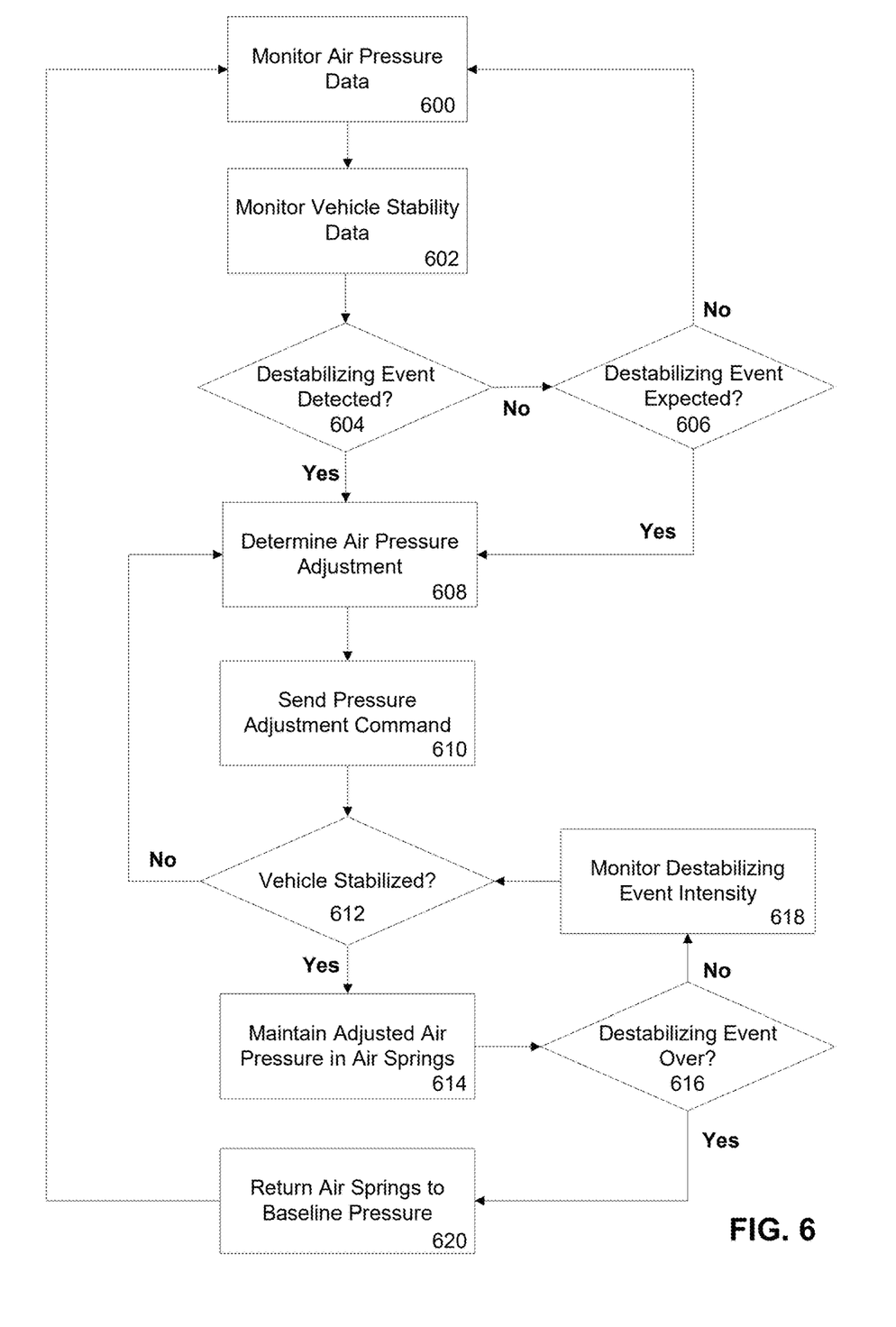
FIG. 6 is an exemplary flow chart illustrating the control of an air spring and stability control system for a vehicle, in accordance with an embodiment of the present disclosure.

FIG. 6 is an exemplary method flow illustrating the control of an air spring and stability control system for a vehicle. In an example embodiment, at 600, the suspension sensor 408 monitors air pressure data from the air springs. At 602, the control 440 and/or air pressure and stability control module 442 monitors vehicle stability data of the vehicle. At 604, it is determined whether a destabilizing event is detected by the control 440 and/or air pressure and stability control module 442 based on vehicle stability data. If a negative determination is made at 604, the process continues at 606, where it is determined whether a destabilizing event is expected (e.g. predicted destabilizing event) by the control 440 and/or air pressure and stability control module 442 based on vehicle stability data. If a negative determination is made at 606, the process continues at 600 and 602, with the continued monitoring of air pressure data and vehicle stability data, respectively. If a positive determination is made at 604 or 606, the process continues at 608 where the control 440 and/or air pressure and stability control module 442 determines an air pressure adjustment that changes the air pressure in one or more of the air springs from a baseline air pressure to an adjusted air pressure. At 610, the air pressure adjustment command is sent to components of the air spring and stability control system, wherein one or more of the air springs, air valves, and air sources are actuated accordingly to adjust the air pressure with the one or more air springs to the adjusted air pressure to counteract the destabilizing event. At 612, a determination is made by the control 440 and/or air pressure and stability control module 442 based on vehicle stability data as to whether the vehicle has been stabilized in response to the destabilizing event. If a positive determination is made at 612, the process continues at 614 and the air springs are maintained with the adjusted air pressure. If a negative determination is made at 612, the process continues at 608, with a further air pressure adjustment being determined. At 610, the further air pressure adjustment is sent as an updated pressure adjustment command providing an updated adjusted air pressure. At 616, a determination is made by the control 440 and/or air pressure and stability control module 442 based on vehicle stability data as to whether the destabilizing event is over. If a negative determination is made at

616, the process continues at 618 where the intensity of the destabilizing event is monitored based on vehicle stability data. The process continues at 612 where the determination of vehicle stability is repeated as described above. If a positive determination is made at 616, the process continues at 620 and the air springs are returned to the baseline pressure. The process then continues to 600 and 602, with the monitoring of air pressure data and vehicle stability data, respectively.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, and algorithms, described above may be implemented as electronic hardware, software, or combinations of both. Certain disclosed components, blocks, modules, circuits are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element recited in the singular and proceeded with the word "a" or "an" should be understood as not excluding plural elements unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. An air spring system for a vehicle, comprising:
a plurality of air springs each having a pressure sensor, wherein each of the air springs is configured to be variably pressurized to stabilize the vehicle; and
an air pressure and stability control system comprising,
an air source supplying air to the air spring system,
a plurality of air valves for adjusting air pressure within the air springs, and
a controller coupled to the air valves, the air source, and a computing system of the vehicle, wherein the controller is configured to:
monitor the air pressure in each of the air springs by receiving air pressure data from the pressure sensor of each of the air springs, wherein monitoring the air pressure includes establishing a baseline air pressure,
receive vehicle stability data from the computing system of the vehicle,
monitor for a predicted destabilizing event based on the vehicle stability data, wherein the vehicle stability data includes vehicle sensor data from one or more vehicle sensors including, RADAR, LiDAR, a camera, a wind sensor, and an inertial measurement unit,
determine an air pressure adjustment to counteract the predicted destabilizing event, wherein the air pressure adjustment is based on the vehicle stability data, and
send an air pressure adjustment command to one or more of the air valves to adjust the air pressure in the air springs to an adjusted air pressure.

2. The air spring system of claim 1, wherein the vehicle stability data further includes one or more of load plan data, route data, and outside vehicle data.

3. The air spring system of claim 2, wherein the outside vehicle data includes data from one or more remotely located vehicles.

4. The air spring system of claim 2, wherein the route data includes data from one or more data sources including route map data and weather data.

5. The air spring system of claim 1, wherein the air pressure adjustment is determined proactively and the air pressure adjustment command is sent before the predicted destabilizing event.

6. The air spring system of claim 1, wherein the predicted destabilizing event is based on route data.

7. The air spring system of claim 1, wherein the controller is further configured to monitor for a conclusion of the predicted destabilizing event.

8. The air spring system of claim 6, wherein the controller is further configured to return the air pressure to the baseline air pressure at the conclusion of the predicted destabilizing event.

9. The air spring system of claim 1, wherein each of the air springs is adjusted by one of the air valves.

10. The air spring system of claim 1, wherein the air source includes one or more air compressors.

11. The air spring system of claim 1, wherein the air source includes one or more air tanks.

12. A method for controlling an air spring system of a vehicle, comprising:
monitoring air pressure in one or more air springs by receiving air pressure data from a pressure sensor of each of the air springs, wherein monitoring the air pressure includes establishing a baseline air pressure,
receiving vehicle stability data from a computing system of the vehicle,
monitoring for a predicted destabilizing event based on the vehicle stability data, wherein the vehicle stability data includes vehicle sensor data from one or more vehicle sensors including, RADAR, LiDAR, a camera, a wind sensor, and an inertial measurement unit,
determining an air pressure adjustment to counteract the predicted destabilizing event, wherein the air pressure adjustment is based on the vehicle stability data, and
sending an air pressure adjustment command to one or more of air valves to adjust the air pressure in the air springs to an adjusted air pressure.

13. The method of claim 12, wherein the vehicle stability data further includes one or more of load plan data, route data, and outside vehicle data.

14. The method of claim 13, wherein the outside vehicle data includes data from one or more remotely located vehicles.

15. The method of claim 13, wherein the route data includes data from one or more data sources including route map data and weather data.

16. The method of claim 12, further comprising:
determining the air pressure adjustment proactively; and
sending the air pressure adjustment command before the predicted destabilizing event.

17. The method of claim 16, comprising monitoring for a conclusion of the predicted destabilizing event.

18. The method of claim 17, comprising returning the air pressure to the baseline air pressure at the conclusion of the predicted destabilizing event.

19. The method of claim 12, wherein the predicted destabilizing event is based on route data.

20. An air spring system for a vehicle, comprising:
a plurality of air springs each having a pressure sensor, wherein each of the air springs is configured to be variably pressurized to stabilize the vehicle; and
an air pressure and stability control system comprising,
an air source supplying air to the air spring system,
a plurality of air valves for adjusting air pressure within the air springs, and
a controller coupled to the air valves, the air source, and a computing system of the vehicle, wherein the controller is configured to:
monitor the air pressure in each of the air springs by receiving air pressure data from the pressure sensor of each of the air springs, wherein monitoring the air pressure includes establishing a baseline air pressure,
receive vehicle stability data from the computing system of the vehicle, the vehicle stability data includes data from one or more remotely located vehicles,
monitor for a destabilizing event based on the vehicle stability data, wherein the vehicle stability data includes vehicle sensor data from one or more vehicle sensors including, RADAR, LiDAR, a camera, a wind sensor, and an inertial measurement unit,
determine an air pressure adjustment to counteract the destabilizing event, wherein the air pressure adjustment is based on the vehicle stability data, and
send an air pressure adjustment command to one or more of the air valves to adjust the air pressure in the air springs to an adjusted air pressure.

* * * * *